United States Patent
Kitade et al.

(10) Patent No.: US 8,998,399 B2
(45) Date of Patent: Apr. 7, 2015

(54) ACTIVE-ENERGY-RAY-CURABLE INK JET RECORDING INK COMPOSITION AND METHOD FOR FORMING IMAGE

(75) Inventors: Maiko Kitade, Saitama (JP); Yutaka Yamada, Saitama (JP); Naohito Saito, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/125,650

(22) PCT Filed: May 30, 2012

(86) PCT No.: PCT/JP2012/063865
§ 371 (c)(1),
(2), (4) Date: Dec. 12, 2013

(87) PCT Pub. No.: WO2012/172973
PCT Pub. Date: Dec. 20, 2012

(65) Prior Publication Data
US 2014/0104356 A1    Apr. 17, 2014

(30) Foreign Application Priority Data
Jun. 14, 2011   (JP) ................................. 2011-132143

(51) Int. Cl.
| | |
|---|---|
| *B41J 2/01* | (2006.01) |
| *B41J 11/00* | (2006.01) |
| *B41J 2/21* | (2006.01) |
| *C09D 11/101* | (2014.01) |
| *C09D 11/322* | (2014.01) |
| *C09D 11/00* | (2014.01) |
| *C09D 11/30* | (2014.01) |
| *B41M 7/00* | (2006.01) |

(52) U.S. Cl.
CPC ............. *B41J 11/002* (2013.01); *B41J 2/2107* (2013.01); *C09D 11/101* (2013.01); *C09D 11/322* (2013.01); *B41J 2/01* (2013.01); *C09D 11/00* (2013.01); *C09D 11/30* (2013.01); *B41M 7/0081* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00

USPC ........... 347/100, 102, 101, 88, 95, 96, 99, 21, 347/20, 9; 106/31.6, 31.13, 31.27; 523/160, 523/161

See application file for complete search history.

(56) References Cited

U.S. PATENT DOCUMENTS

| | | | | |
|---|---|---|---|---|
| 2004/0141040 | A1* | 7/2004 | Nakajima | ...................... 347/102 |
| 2008/0108747 | A1* | 5/2008 | Nakamura et al. | ............. 524/606 |
| 2009/0000508 | A1* | 1/2009 | Edison et al. | ................. 106/31.6 |
| 2009/0118388 | A1* | 5/2009 | Naruse et al. | .................. 347/102 |
| 2011/0223391 | A1* | 9/2011 | Nishimura et al. | ......... 428/195.1 |

FOREIGN PATENT DOCUMENTS

| | | |
|---|---|---|
| JP | 2003-192943 A | 7/2003 |
| JP | 2004-067991 A | 3/2004 |
| JP | 2007-297516 A | 11/2007 |
| JP | 2008-507598 A | 3/2008 |
| JP | 2009-096910 A | 5/2009 |
| JP | 2009-161641 A | 7/2009 |
| JP | 2010-143982 A | 7/2010 |
| JP | 2010-235914 A | 10/2010 |
| JP | 2012-092291 A | 5/2012 |
| JP | 2012-116934 A | 6/2012 |
| JP | 2012-144682 A | 8/2012 |
| WO | 2010/064330 A1 | 6/2010 |

OTHER PUBLICATIONS

An International Search Report, mailed Aug. 21, 2012, which issued during the prosecution of International Patent Application No. PCT/JP2012/063865, which corresponds to the present application.

* cited by examiner

*Primary Examiner* — Manish S Shah
(74) *Attorney, Agent, or Firm* — McDermott Will & Emery LLP

(57) ABSTRACT

An active-energy-ray-curable ink jet recording ink composition is provided, in which (1) a polymerizable compound having an active-energy-ray-polymerizable group and a polymerizable compound having at least two active-energy-ray-polymerizable groups are used in amounts of 10 to 25 mass % and 75 to 90 mass % relative to the total amount of the active-energy-ray-polymerizable compounds, respectively; (2) the polymerizable compound having an active-energy-ray-polymerizable group includes 10 to 20 mass % of N-vinylcaprolactam; and (3) the polymerizable compound having at least two active-energy-ray-polymerizable groups includes 15 to 35 mass % of 2-(2-vinyloxyethoxy)ethyl(meth)acrylate. Furthermore, a method for forming an image is provided.

5 Claims, No Drawings

ACTIVE-ENERGY-RAY-CURABLE INK JET RECORDING INK COMPOSITION AND METHOD FOR FORMING IMAGE

CROSS REFERENCE TO PRIOR APPLICATIONS

This application is a U.S. National Phase application under 35 U.S.C. §371 of International Application No. PCT/JP2012/063865, filed on May 30, 2012 and claims benefit of priority to Japanese Patent Application No. 2011-132143, filed on Jun. 14, 2011. The International Application was published in Japanese on Dec. 20, 2012 as WO 2012/172973 A1 under PCT Article 21(2). The contents of the above applications are hereby incorporated by reference.

TECHNICAL FIELD

The present invention relates to an active-energy-ray-curable ink jet recording ink composition which can be well cured even with a light-emitting diode (LED) as a light source and which enables development of good adhesiveness and scratch resistance.

BACKGROUND ART

In printing with a recording apparatus in which an ink jet printing technique is used, ink is ejected from nozzles and then adheres to a recording medium. Since the nozzles are positioned away from a recording medium, printing can be carried out on surfaces having irregular shapes, such as a curved surface and an uneven surface, in a good manner. Hence, such printing has been expected to be widely used in industrial applications.

In general, inks used in such ink jet recording include aqueous dye inks containing water as the prime solvent and non-aqueous (oil-based) dye inks containing organic solvents as the prime solvent. Typical aqueous dye inks have, however, problems when they are used for industrial purposes, such as an insufficient drying rate of a printed film formed thereof on materials which are less likely to absorb liquid, e.g., plastic films; insufficient adhesive properties (adhesiveness) of a printed film; and insufficient durability, e.g., abrasion resistance, water resistance, and light fastness. On the other hand, oil-based dye inks contain chromium complex dyes composed of heavy metals such as chromium and therefore have problems in terms of safety. In order to overcome such problems related to colorants, various inks have been proposed, such as aqueous pigment inks and oil-based pigment inks which contain pigments as colorants and active-energy-ray-curable ink jet recording inks which are substantially free from non-polymerizable solvents such as organic solvents used for dilution and dissolution and which enables a printed film to be cured and dried by being irradiated with an active energy ray such as ultraviolet light.

In the case of using active-energy-ray-curable ink jet recording inks, since a printed film is irradiated with an active energy ray for curing, relatively high durability can be imparted to the printed film. There has been, however, a problem in which adhesiveness is insufficient in printing on materials which are less likely to absorb liquid, e.g., plastic films. Although a variety of oligomers and adhesive resins may be effectively used to enhance the adhesiveness, this approach leads to an increase in the viscosity of the ink, which forces printing heads to be driven under limited conditions for stable ink ejection. In particular, in the case where small ink droplets are ejected, ejection of the small droplets of a highly viscous ink causes problems such as an increase in the number of satellite droplets; a reduction in the precision of landing of ink, e.g., ejection in an unintended direction; and nozzle clogging. Use of reactive monomers having a high solubility, such as tetrahydrofurfuryl acrylate and cyclohexyl acrylate, is another effective approach to enhance the adhesiveness; however, such an approach causes a problem, for example, in terms of VOC and thus is environmentally unsuitable.

An active-energy-ray-curable ink jet ink composition (for instance, see Patent Literature 1) is known as an technique for enhancing adhesiveness; the ink composition contains polymerizable monofunctional monomers in an amount of 60% to 98% relative to the total amount of polymerizable monomers, one of the monofunctional monomers is isobornyl acrylate, the isobornyl acrylate content is from 25% to 65% relative to the total amount of the polymerizable monomers, one of the monofunctional monomers is N-vinylcaprolactam, and the N-vinylcaprolactam content is from 12.5% to 60% relative to the total amount of the polymerizable monomers.

Use of a light-emitting diode lamp (hereinafter referred to as "LED lamp") having a low energy as a light source for active-energy-ray-curable ink jet recording inks has become popular instead of use of typical light sources such as a metal halide lamp and a high-pressure mercury lamp. A light-emitting diode UV-LED which is an example of LED lamps emits ultraviolet light having the peak emission wavelength ranging from 350 to 420 nm. In the case where the UV-LED is used for inks suitable for traditional light sources such as a metal halide lamp and a high-pressure mercury lamp, a photopolymerization initiator which can absorb light having a wavelength of around 350 to 420 nm needs to be used; however, since a pigment itself contained in the ink can absorb light having a wavelength ranging from 350 to 420 nm, even use of the photopolymerization initiator which can absorb light having a wavelength of 350 to 420 nm eventually leads to a problem of insufficient curing in many cases. Thus, in an attempt to cure the inks disclosed in Patent Literatures 1 and 2 with an LED lamp, durability, particularly scratch resistance, cannot be imparted to a printed film in some cases.

CITATION LIST

Patent Literature

PTL 1: Japanese Unexamined Patent Application Publication No. 2010-235914

PTL 2: Japanese Unexamined Patent Application Publication No. 2004-67991

SUMMARY OF INVENTION

Technical Problem

It is an object of the present invention to provide an active-energy-ray-curable ink jet recording ink composition which can be well cured even with an LED lamp as a light source and which enables development of good adhesiveness and scratch resistance.

Solution to Problem

The inventors have found an active-energy-ray-curable ink jet recording ink composition which satisfies the following requirements (1) to (3) can be well cured even with an LED lamp as a light source and enables development of good adhesiveness and solvent resistance:

(1) a polymerizable compound having an active-energy-ray-polymerizable group (hereinafter referred to as monofunctional monomer) and a polymerizable compound having at least two active-energy-ray-polymerizable groups (hereinafter referred to as polyfunctional monomer) are used in amounts of 10 to 25 mass % and 75 to 90 mass % relative to the total amount of the active-energy-ray-polymerizable compounds, respectively;

(2) the polymerizable compound having an active-energy-ray-polymerizable group includes 10 to 20 mass % of N-vinylcaprolactam; and (3) the polymerizable compound having at least two active-energy-ray-polymerizable groups includes 15 to 35 mass % of 2-(2-vinyloxyethoxy)ethyl(meth)acrylate.

In the technique disclosed in Patent Literature 1, a large amount of a polymerizable compound having an active-energy-ray-polymerizable group (hereinafter referred to as monofunctional monomer) is used to develop adhesiveness; however, in the case where curing is carried out with an LED, sufficient scratch resistance is less likely to be developed. The inventors have found that the above-mentioned object can be achieved by the following approach:
reducing the amount of (1) a monofunctional monomer and using predetermined amounts of (2) N-vinylcaprolactam and (3) 2-(2-vinyloxyethoxy)ethyl(meth)acrylate in combination (for instance, see Patent Literature 2), the 2-(2-vinyloxyethoxy)ethyl(meth)acrylate being known as a monomer which is less viscous, odorous, and skin-irritating.

In particular, an aspect of the present invention provides an active-energy-ray-curable ink jet recording ink composition containing active-energy-ray-polymerizable compounds and a photopolymerization initiator, wherein (1) a polymerizable compound having an active-energy-ray-polymerizable group and a polymerizable compound having at least two active-energy-ray-polymerizable groups are used in amounts of 10 to 25 mass % and 75 to 90 mass % relative to the total amount of the active-energy-ray-polymerizable compounds, respectively;

(2) the polymerizable compound having an active-energy-ray-polymerizable group includes 10 to 20 mass % of N-vinylcaprolactam; and (3) the polymerizable compound having at least two active-energy-ray-polymerizable groups includes 15 to 35 mass % of 2-(2-vinyloxyethoxy)ethyl(meth)acrylate.

Another aspect of the present invention provides a method for forming an image, the method including ejecting an active-energy-ray-curable ink jet recording ink composition to a recording medium to print an image and irradiating the image with an active energy ray having the peak wavelength ranging from 365 to 420 nm with a light-emitting diode (LED) to cure the image, wherein the active-energy-ray-curable ink jet recording ink composition is the above-mentioned ink composition.

Advantageous Effects of Invention

An aspect of the present invention provides an active-energy-ray-curable ink jet recording ink composition which can be well cured even with a light-emitting diode (LED) as a light source and which enables development of good adhesiveness and solvent resistance.

DESCRIPTION OF EMBODIMENTS (Active-Energy-Ray-Polymerizable Compound)

An active-energy-ray-polymerizable compound used in the present invention has the following characteristics; (1) a monofunctional monomer and a polyfunctional monomer are used in amounts of 10 to 25 mass % and 75 to 90 mass % relative to the total amount of the active-energy-ray-polymerizable compounds, respectively, (2) the monofunctional monomer includes 10 to 20 mass % of N-vinylcaprolactam, and (3) the polyfunctional monomer includes 15 to 35 mass % of 2-(2-vinyloxyethoxy)ethyl(meth)acrylate.

Such percentages of (1) the monofunctional monomer and polyfunctional monomer enable production of an ink having adhesiveness and solvent resistance in a well-balanced manner.

In the present invention, it is essential to use 10 to 20 mass % of N-vinylcaprolactam as (2) the monofunctional monomer. N-vinylcaprolactam is a monomer which enables adhesion to plastic materials and solvent resistance in a well-balanced manner; in the present invention, the content of not less than 10 mass % gives such effects. In the case where the content is excess, however, storage stability tends to be impaired; hence, the content is preferably up to 25 mass %, more preferably not more than 20 mass %, and most preferably not more than 15 mass %. In particular, a black ink containing, for example, carbon black especially has such tendency.

Any monofunctional monomer other than N-vinylcaprolactam can be used, and known monofunctional monomers can be used. Examples thereof include (meth)acrylate, vinylpyrrolidone, and N-vinylformamide having substituents such as methyl, ethyl, propyl, butyl, amyl, 2-ethylhexyl, isooctyl, nonyl, dodecyl, hexadecyl, octadecyl, cyclohexyl, benzyl, methoxyethyl, butoxyethyl, phenoxyethyl, nonylphenoxyethyl, glycidyl, dimethylaminoethyl, diethylaminoethyl, isobornyl, dicyclopentanyl, dicyclopentenyl, and dicyclopentenyloxyethyl.

In the present invention, it is also essential to use 15 to 35 mass % of 2-(2-vinyloxyethoxy)ethyl(meth)acrylate as (3) the polyfunctional monomer. At a content less than 10 mass %, an intended crosslink density is not obtained, and a coating film to be formed tends to have an insufficient solvent resistance; hence, the content is preferably not less than 15 mass %, and most preferably not less than 20 mass %. In particular, a black ink containing, for example, carbon black especially has such tendency.

Also at a content greater than 35 mass %, a coating film to be formed tends to have an insufficient solvent resistance as well as poor adhesiveness.

Any polyfunctional monomer other than 2-(2-vinyloxyethoxy)ethyl(meth)acrylate can be used, and known polyfunctional monomers can be used; however, in terms of reactivity to active energy rays, (meth)acrylates are preferably used. Examples of polyfunctional (meth)acrylates include di(meth)acrylates such as 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, and polypropylene glycol; di(meth)acrylates of tris(2-hydroxyethyl)isocyanurate; neopentyl glycol di(meth)acrylates; bisphenol A di(meth)acrylates; bisphenol F di(meth)acrylates; hydrogenated bisphenol A di(meth)acrylates; trimethylolpropane tri(meth)acrylates; pentaerythritol tri(meth)acrylates; poly(meth)acrylates of dipentaerythritol; and alkylene-oxide-modified products and caprolactone-modified products such as ethylene oxides and propylene oxides of the above-mentioned monomers. These monomers may be used in combination.

Among these polyfunctional monomers, polyfunctional monomers having a low viscosity are preferably used in terms of ejection stability. In addition, the extraordinary amount of tri- or higher-functional monomers may impair adhesiveness; hence, the amount is preferably less than 10 mass %.

In particular, use of ethylene-oxide-modified bisphenol A di(meth)acrylate enables development of high abrasion resistance and is therefore preferred. In the case where ethylene oxide is extraordinarily added, drying properties tend to be reduced; hence, not more than 4 mol of ethylene oxide is preferably added.

In the present invention, reactive oligomers having a high molecular weight, such as a (meth)acrylate oligomer, may be used in a small amount to enhance crosslink density provided that the effects of the present invention are not impaired. The amount thereof is preferably up to 20 mass % relative to the total amount of the active-energy-ray-polymerizable compounds.

Examples of the reactive oligomers include urethane(meth)acrylate oligomers, epoxy(meth)acrylate oligomers, and polyester(meth)acrylate oligomers. These oligomers may be used in combination.

Depending on types of an ink jet apparatus to be used, the active-energy-ray-polymerizable compounds are preferably prepared such that the viscosity thereof is approximately in the range of 1 to 100 mPa·s after the monomers are mixed.

(Photopolymerization Initiator)

In the case where ultraviolet light is used as an active energy ray in the present invention, a photopolymerization initiator is preferably used. A radically polymerizable photopolymerization initiator is used as the photopolymerization initiator.

In particular, preferred examples thereof include benzoin isobutyl ether, 2,4-diethylthioxanthone, 2-isopropylthioxanthone, benzyl, 2,4,6-trimethylbenzoyldiphenylphosphine oxide-6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-trimethylpentyl phosphine oxide. Furthermore, other molecule-cleavage-type photopolymerization initiators may be used in combination with the above-described polymerization initiators, such as 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl)-2-morpholino-propan-1-one. Moreover, hydrogen-abstraction-type photopolymerization initiators, such as benzophenone, 4-phenylbenzophenone, isophthalphenone, and 4-benzoyl-4'-methyl-diphenyl sulfide, may be additionally used.

In particular, in the case of using an LED, the photopolymerization initiator is preferably selected in consideration of the peak emission wavelength of the LED. Examples of the photopolymerization initiator suitable for the case in which a UV-LED is used include 2-benzyl-2-dimethylamino-1-(4-morpholinophenyl)-butan-1-one, 2-(dimethylamino)-2-[(4-methylphenyl)methyl]-1-(4-morpholinophenyl)-butan-1-one), bis(2,4,6-trimethylbenzoyl)phenylphosphine oxide, 2,4,6-trimethylbenzoyl-diphenyl-phosphine oxide, 2,4-diethylthioxanthone, and 2-isopropylthioxanthone.

A sensitizer may be used in combination with the above-mentioned photopolymerization initiator, and examples thereof include amines which do not induce the addition reaction with the above-mentioned polymerizable components, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone.

In order to enhance the storage stability of an ink, the active-energy-ray-curable ink jet recording ink composition of the present invention may contain a polymerization inhibitor, such as hydroquinone, methoquinone, di-t-butylhydroquinone, P-methoxyphenol, butylhydroxytoluene, or a nitrosamine salt, in an amount ranging from 0.01 to 2 mass % relative to the ink.

(Colorant)

The active-energy-ray-curable ink jet recording ink composition of the present invention can be applied to colorant-free inks such as varnish. A colorant, however, may be used on the basis of intended use. A colorant to be used may be a dye or a pigment; a pigment is preferably used in view of the durability of printed articles.

Examples of dyes usable in the present invention include a variety of dyes generally used in ink jet recording, such as direct dyes, acid dyes, food colors, basic dyes, reactive dyes, disperse dyes, vat dyes, soluble vat dyes, and reactive disperse dyes.

Examples of pigments usable in the present invention include inorganic pigments and organic pigments. Examples of the inorganic pigments include titanium oxide, iron oxide, and carbon blacks produced by known methods such as a contact method, a furnace method, and a thermal method. Examples of the organic pigments include azo pigments (including azolake, insoluble azo pigments, condensed azo pigments, and chelate azo pigments); polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments); dye chelates (e.g., basic dye chelates and acid dye chelates), nitro pigments, nitroso pigments, and aniline black.

Specific Examples of the pigments include carbon blacks such as No. 2300, No. 900, MCF88, No. 33, No. 40, No. 45, No. 52, MA7, MA8, MA100, and No. 2200B (manufactured by Mitsubishi Chemical Corporation); Raven 5750, 5250, 5000, 3500, 1255, and 700 (manufactured by Columbian Chemicals Company); Regal 400R, 330R, and 660R, Mogul L and 700, and Monarch 800, 880, 900, 1000, 1100, 1300, and 1400 (manufactured by Cabot Corporation); and Color Black FW1, FW2, FW2V, FW18, and FW200, Color Black S150, S160, and S170, Printex 35, U, V, and 140U, and Special Black 6, 5, 4A, and 4 (manufactured by Degussa AG).

Examples of pigments used for yellow inks include C. I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Examples of pigments used for magenta inks include C. I. Pigment Red 5, 7, 12, 48 (Ca), 48 (Mn), 57 (Ca), 57:1, 112, 122, 123, 168, 184, 202, and 209; and C. I. Pigment Violet 19.

Examples of pigments used for cyan inks include C. I. Pigment Blue 1, 2, 3, 15:3, 15:4, 60, 16, and 22.

The average particle size of the pigment is in the range of preferably 10 to 200 nm, and more preferably approximately 50 to 150 nm. In order to develop sufficient image density and enable printed images to have sufficient light fastness, the colorant content is preferably in the range of 1 to 20 mass % relative to the total amount of the ink.

In the case where the active-energy-ray-curable ink jet recording ink composition contains a colorant, such a colorant-containing ink composition may be prepared so as to have a color variation in individual colors. For example, if four fundamental colors, namely, yellow, magenta, cyan, and black, are used in combination with deep and light colors thereof, the ink compositions of light magenta and red which are pale and deep magenta, respectively, are prepared in addition to the ink compositions of magenta; the ink compositions of light cyan and blue which are pale and deep cyan, respectively, are prepared in addition to the ink composition of cyan; and the ink compositions of gray and light black and mat black which are pale and deep black, respectively, are prepared in addition to the ink composition of black.

In addition to the components described above, surfactants; leveling agents; matting agents; and materials used for adjusting physical properties of a film, such as polyester resins, polyurethane resins, vinyl resins, acrylic resins, rubber resins, and waxes can be optionally used provided that the effects of the present invention and ejection stability are not impaired.

A pigment dispersant is preferably used to enhance the dispersion stability of the pigment relative to, for example, the above-mentioned active-energy-ray-polymerizable compounds. Specific examples thereof include, but are not limited to, AJISPER PB821, PB822, and PB817 manufactured by Ajinomoto Fine-Techno Co., Inc.; Solsperse 24000GR, 32000, 33000, and 39000 manufactured by Avecia; and DISPARLON DA-703-50, DA-705, and DA-725 manufactured by Kusumoto Chemicals, Ltd. The amount of the pigment dispersant is preferably in the range of 10 to 80 mass %, and especially preferably 20 to 60 mass % relative to the pigment. At an amount less than 10 mass %, the dispersion stability is likely to be insufficient; at an amount greater than 80 mass %, the ink viscosity is likely to be increased with the result that ejection stability is readily reduced.

In order to, for instance, be adhesive to a printing medium, the active-energy-ray-curable ink jet recording ink composition of the present invention may contain non-reactive resins, such as an acrylic resin, an epoxy resin, a terpene phenol resin, and a rosin ester, provided that the effects of the present invention are not impaired.

In the case where the active-energy-ray-curable ink jet recording ink composition of the present invention contains a pigment, the active-energy-ray-curable ink jet recording ink composition can be produced by dispersing the pigment in a mixture of the pigment and active-energy-ray-polymerizable compounds and optionally a pigment dispersant and a resin with a common disperser such as a bead mill, adding a photopolymerization initiator to the resulting mixture, optionally adding an additive such as a regulator of surface tension thereto, and then stirring the product for dissolution. The active-energy-ray-curable ink jet recording ink composition can also be produced by preliminarily preparing a highly concentrated pigment dispersion liquid (millbase) with a common disperser such as a bead mill and then mixing the pigment dispersion liquid with active-energy-ray polymerizable compounds in which a photopolymerization initiator has been dissolved, an additive, or another material under stirring.

A variety of known dispersers other than a bead mill can be employed as a stirrer•disperser used for dispersing the pigment, such as an ultrasonic homogenizer, a high-pressure homogenizer, a paint shaker, a ball mill, a roll mill, a sand mill, a sand grinder, a Dyno-Mill, a Dispermat, an SC MILL, and a NANOMIZER.

The active-energy-ray-curable ink jet recording ink composition of the present invention can be cured by being irradiated with light such as an active energy ray, preferably ultraviolet light. Examples of a light source of ultraviolet light or another light include light sources generally used for UV-curable ink jet inks, such as a metal halide lamp, a xenon lamp, a carbon arc lamp, a chemical lamp, a low-pressure mercury lamp, and a high-pressure mercury lamp, and the ink composition can be cured without any problem by use of these lamps. The curing can be carried out with commercially available products such as an H lamp, a D lamp, and a V lamp manufactured by Fusion Systems Co., Ltd.

The active-energy-ray-curable ink jet recording ink composition of the present invention is highly sensitive and can be therefore cured with ultraviolet-light-emitting semiconductor devices such as a UV-LED and an ultraviolet-light-emitting semiconductor laser. In particular, an image can be formed through the following processes: ejecting the active-energy-ray-curable ink jet recording ink composition to a recording medium to print the image and irradiating the image with an active energy ray having a peak wavelength ranging from 365 to 420 nm with an LED lamp to cure the image.

Any known ink jet recording technique can be used. Examples thereof include a technique in which the vibration of a piezoelectric device is utilized to eject liquid droplets (recording method involving use of an ink jet head for forming ink droplets by mechanical deformation of an electrostrictive device) and a technique in which thermal energy is utilized.

In the ink jet recording method of the present invention, a photocurable ink composition to be used exhibits low PII (low skin irritation) and low viscosity and is highly photocurable even by being irradiated with ultraviolet light at low light intensity; hence, the ink can be easily handled and exhibit high ejection stability, and an image which is highly curable even at low light intensity can be formed.

The active-energy-ray-curable ink jet recording ink composition of the present invention is highly adhesive to plastic materials. Hence, the ink composition enables easy printing even on a surface of a plastic product or another product having an irregular shape such as a curved surface or an uneven shape. Specific examples thereof include materials generally used as plastic materials for injection molding, such as ABS-based polymer alloys, e.g., an ABS (acrylonitrile-butadiene-styrene) resin, a PVC (polyvinyl chloride)/ABS resin, a PA (polyamide)/ABS resin, a PC (polycarbonate)/ABS resin, and a PBT (polybutylene terephthalate)/ABS; and an AAS (acrylonitrile-acrylic rubber-styrene) resin, an AS (acrylonitrile-styrene) resin, an AES (acrylonitrile-ethylene rubber-styrene) resin, an MS ((meth)acrylate-styrene)-based resin, a PC (polycarbonate)-based resin, an acrylic resin, a methacrylic resin, and a PP (polypropylene)-based resin.

Films formed of plastic materials, such as thermoplastic resin films used as packaging materials, can be employed as a recording medium. Examples of the thermoplastic resin films used for food packaging include polyolefin films such as polyethylene terephthalate (PET) films, polystyrene films, polyamide films, polyacrylonitrile films, polyethylene films (LLDPE: low-density polyethylene film and HDPE: high-density polyethylene film), and polypropylene films (CPP: cast polypropylene film and OPP: oriented polypropylene film); and polyvinyl alcohol films and ethylene-vinyl alcohol copolymer films. These films may be uniaxially or biaxially stretched. Furthermore, the surface of the film may be optionally subjected to a variety of surface treatments such as a flame treatment and a corona discharge treatment.

EXAMPLES

The present invention will now be described further in detail with reference to Examples; however, the present invention should not be limited thereto. In Examples, the term "part" is on a mass basis.

[Example of Preparation of High-Concentrated Pigment Dispersion Liquid (Millbase)]

(Example of Production of Millbase (1))

The following components were mixed with each other by being stirred for an hour with a stirrer and then dispersed for two hours with a bead mill to produce a millbase (1).

| | |
|---|---|
| Fastogen blue TGR-G<br>Phthalocyanine pigment C.I. Pigment Blue 15:4,<br>manufactured by DIC Corporation | 10 parts |
| Solsperse 32000<br>Polymer pigment dispersant, manufactured by The Lubrizol Corporation | 4.5 parts |
| LIGHT ACRYLATE PO-A<br>Phenoxy ethyl acrylate (monofunctional monomer),<br>manufactured by kyoeisha Chemical Co., Ltd. | 18 parts |
| Miramer M222<br>Dipropylene glycol diacrylate (polyfunctional monomer),<br>manufactured by Miwon Specialty Chemical Co., Ltd. | 67.5 parts |

[Example of Preparation of High-Concentrated Pigment Dispersion Liquid (Millbase)]

(Example of Production of Millbase (2))

The following components were mixed with each other by being stirred for an hour with a stirrer and then dispersed for two hours with a bead mill to produce a millbase (2).

| | |
|---|---|
| LEVASCREEN Yellow G01<br>C.I. Pigment Yellow 150, manufactured by LANXESS | 10 parts |
| Solsperse 33000<br>Polymer pigment dispersant, manufactured by The Lubrizol Corporation | 6 parts |
| Miramer M222<br>Dipropylene glycol diacrylate (polyfunctional monomer),<br>manufactured by Miwon Specialty Chemical Co., Ltd. | 84 parts |

[Example of Preparation of High-concentrated Pigment Dispersion Liquid (Millbase)]

(Example of Production of Millbase (3))

The following components were mixed with each other by being stirred for an hour with a stirrer and then dispersed for two hours with a bead mill to produce a millbase (3).

| | |
|---|---|
| #960<br>Carbon black manufactured by Mitsubishi Chemical Corporation | 10 parts |
| Solsperse 32000<br>Polymer pigment dispersant, manufactured by The Lubrizol Corporation | 4.5 parts |
| LIGHT ACRYLATE PO-A<br>Phenoxy ethyl acrylate (monofunctional monomer),<br>manufactured by kyoeisha Chemical Co., Ltd. | 18 parts |
| Miramer M222<br>Dipropylene glycol diacrylate (polyfunctional monomer),<br>manufactured by Miwon Specialty Chemical Co., Ltd. | 84 parts |

Examples 1 to 12

Method for Producing Active-Energy-Ray-Curable Ink Jet Recording Ink Composition Active-energy-ray-curable ink jet recording ink compositions were produced as shown in Tables 1 and 2. In particular, photopolymerization initiators including 5 parts of Irgacure 819 (manufactured by BASF SE) and 5 parts of Lucirin TPO (manufactured by BASF SE); a sensitizer that was 2 parts of DETX-S (diethylthioxanthone, manufactured by Nippon Kayaku Co., Ltd.); a regulator of surface tension including 0.1 parts of KF-615 (polyether-modified silicone oil, manufactured by Shin-Etsu Silicone) and 0.5 parts of KF-54 (methylphenyl silicone oil, manufactured by Shin-Etsu Silicone); and a polymerization inhibitor that was 0.2 parts of ADK STAB LA-82 (manufactured by ADEKA CORPORATION) were added to a mixture of a monofunctional monomer and a polyfunctional monomer, and the product was stirred for 30 minutes while being heated at 60° C. The millbase (1) prepared in Preparation Example 1 was added thereto, and the materials were thoroughly mixed. Then, the product was filtered through a membrane filter having a pore size of 1.2 to produce each of active-energy-ray-curable ink jet recording ink compositions (1) to (12).

Comparative Examples 1 to 14

Method for Producing Active-Energy-Ray-Curable Ink Jet Recording Ink Composition Comparative active-energy-ray-curable ink jet recording ink compositions (H1) to (H15) were produced as in Example 1 except that components shown in Tables 3 and 4 were used.

(Measurement of Physical Properties)

The surface tension and viscosity of the active-energy-ray-curable ink jet recording ink compositions (1) to (12) and (H1) to (H15) were measured as the physical properties thereof. The measurement was carried out as follows.

[Surface Tension]

The surface tension was measured with a Wilhelmy-type surface tensiometer: CBUP-A3 manufactured by Kyowa Interface Science Co., Ltd. An ink composition was put into a plastic container, and the plastic container was immersed into a constant temperature water bath to preliminarily adjust the temperature of the ink composition to be 25° C. for measurement of the surface tension at 25° C.

[Viscosity]

The viscosity at 45° C. was measured with a viscometer: TVE-20L manufactured by TOKI SANGYO CO., LTD. A rotational rate during the measurement was 50 rpm/mim. In order to carry out stable printing with an evaluative ink jet printer used in Examples of the present invention, the viscosity of each of the ink compositions was adjusted to be between 7 to 12 mPa·sec.

TABLE 1

| | | | Example 1 | Example 2 | Example 3 | Example 4 | Example 5 | Example 6 | Example 7 | Example 8 |
|---|---|---|---|---|---|---|---|---|---|---|
| | Millbase | | (1)<br>20 | (1)<br>20 | (1)<br>20 | (1)<br>20 | (1)<br>20 | (1)<br>20 | (1)<br>20 | (2)<br>30 |
| Polymerizable<br>monomer | Polyfunctional<br>monomer | M3130 | 5 | 5 | 5 | 5 | 5 | 5 | 5 | 5 |
| | | M240 | 20 | 20 | 20 | 20 | 20 | 20 | 20 | 20 |
| | | M222 | 5 | 10 | 15 | 20 | 25 | 10 | 15 | 6 |
| | | VEEA | 35 | 30 | 25 | 20 | 15 | 25 | 25 | 20 |
| | Mono-<br>functional<br>monomer | VCAP | 15 | 15 | 15 | 15 | 15 | 20 | 10 | 19 |
| | | IBXA | 0 | 0 | 0 | 0 | 0 | 0 | 5 | 0 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | Mass % of monofunctional monomer | 19.2 | 19.2 | 19.2 | 19.2 | 19.2 | 24.3 | 19.2 | 20.0 |
| Physical properties | Viscosity [mPa · sec] | 8.01 | 8.53 | 8.91 | 9.36 | 9.76 | 8.71 | 8.96 | 10.28 |
|  | Surface tension [mN/m] | 28.1 | 28.2 | 28.1 | 28.3 | 28.2 | 28.1 | 28.1 | 28.0 |

TABLE 2

|  |  |  | Example 9 | Example 10 | Example 11 | Example 12 |
|---|---|---|---|---|---|---|
|  | Millbase |  | (3) | (3) | (3) | (3) |
|  |  |  | 20 | 20 | 20 | 20 |
| Polymerizable monomer | Polyfunctional monomer | M3130 | 5 | 5 | 5 | 5 |
|  |  | M240 | 20 | 20 | 20 | 20 |
|  |  | M222 | 25 | 20 | 15 | 20 |
|  |  | VEEA | 20 | 20 | 20 | 15 |
|  | Monofunctional monomer | VCAP | 10 | 15 | 20 | 10 |
|  |  | IBXA | 0 | 0 | 0 | 0 |
|  | Mass % of monofunctional monomer |  | 14.0 | 19.2 | 24.3 | 14.0 |
| Physical properties | Viscosity [mPa · sec] |  | 9.32 | 9.38 | 9.43 | 9.53 |
|  | Surface tension [mN/m] |  | 28.1 | 28.2 | 28.1 | 28.3 |

TABLE 3

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
|  | Millbase |  | (1) | (1) | (1) | (1) | (1) | (1) | (1) | (1) |
|  |  |  | 20 | 20 | 20 | 20 | 20 | 20 | 20 | 20 |
| Polymerizable monomer | Polyfunctional monomer | M3130 | 5 | 5 | 5 | 5 | 5 | 5 | 5 | 5 |
|  |  | M240 | 20 | 20 | 20 | 20 | 20 | 20 | 20 | 20 |
|  |  | M222 | 0 | 30 | 40 | 15 | 15 | 5 | 0 | 15 |
|  |  | VEEA | 40 | 10 | 0 | 0 | 0 | 25 | 15 | 25 |
|  |  | DEGDVE | 0 | 0 | 0 | 25 | 0 | 0 | 0 | 0 |
|  |  | TEGDVE | 0 | 0 | 0 | 0 | 25 | 0 | 0 | 0 |
|  | Monofunctional monomer | VCAP | 15 | 15 | 15 | 15 | 15 | 25 | 15 | 5 |
|  |  | IBXA | 0 | 0 | 0 | 0 | 0 | 0 | 25 | 10 |
|  | Mass % of monofunctional monomer |  | 19.2 | 19.2 | 19.2 | 19.2 | 19.2 | 29.5 | 44.9 | 19.2 |
| Physical properties | Viscosity [mPa · sec] |  | 7.62 | 10.29 | 11.63 | 7.01 | 8.53 | 8.70 | 9.50 | 9.01 |
|  | Surface tension [mN/m] |  | 28.1 | 28.0 | 28.1 | 28.1 | 28.2 | 28.1 | 28.3 | 28.1 |

TABLE 4

|  |  |  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|
|  | Millbase |  | (1) | (1) | (1) | (1) | (1) | (1) | (3) |
|  |  |  | 20 | 20 | 20 | 20 | 20 | 20 | 20 |
| Polymerizable monomer | Polyfunctional monomer | M3130 | 5 | 5 | 5 | 5 | 5 | 5 | 5 |
|  |  | M240 | 20 | 20 | 20 | 20 | 20 | 20 | 20 |
|  |  | M222 | 0 | 0 | 15 | 15 | 15 | 15 | 25 |
|  |  | VEEA | 40 | 40 | 25 | 25 | 25 | 25 | 20 |
|  | Monofunctional monomer | VCAP | 0 | 0 | 0 | 0 | 0 | 0 | 5 |
|  |  | POA | 15 | 0 | 15 | 0 | 0 | 0 | 5 |
|  |  | IOA | 0 | 0 | 0 | 15 | 0 | 0 | 0 |
|  |  | IBXA | 0 | 15 | 0 | 0 | 15 | 0 | 0 |
|  |  | THFA | 0 | 0 | 0 | 0 | 0 | 15 | 0 |

TABLE 4-continued

|  |  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
|  | Mass % of monofunctional monomer | 19.2 | 19.2 | 19.2 | 19.2 | 19.2 | 19.2 | 14.0 |
| Physical properties | Viscosity [mPa · sec] | 8.15 | 7.95 | 9.35 | 7.01 | 9.07 | 8.07 | 8.61 |
|  | Surface tension [mN/m] | 28.1 | 28.0 | 28.1 | 28.2 | 28.1 | 28.1 | 28.2 |

The abbreviations in Tables 1 to 4 are as follows:

M3130: 3-mol-EO-modified trimethylolpropane triacrylate, manufactured by Miwon Specialty Chemical Co., Ltd.

M240: 4-mol-EO-modified bisphenol A diacrylate, manufactured by Miwon Specialty Chemical Co., Ltd.

M222: dipropylene glycol diacrylate, manufactured by Miwon Specialty Chemical Co., Ltd.

VEEA: 2-(2-vinyloxyethoxy)ethyl acrylate, manufactured by NIPPON SHOKUBAI CO., LTD.

DEGDVE: diethylene glycol divinyl ether, manufactured by BASF SE

TEGDVE: triethylene glycol divinyl ether, manufactured by BASF SE

VCAP: N-vinylcaprolactam, manufactured by ISP Investments Inc.

IBXA: isobornyl acrylate, manufactured by Osaka Organic Chemical Industry Ltd.

POA: phenoxy ethyl acrylate, manufactured by kyoeisha Chemical Co., Ltd.

IOA: Isooctyl acrylate, manufactured by Osaka Organic Chemical Industry Ltd.

THFA: V#150 (tetrahydrofurfuryl acrylate), manufactured by Osaka Organic Chemical Industry Ltd.

(Evaluation of Ink)

The characteristics of films printed using the active-energy-ray-curable ink jet recording ink compositions (1) to (12) and (H1) to (H15) were evaluated as follows.

[Printing on Substrate]

The active-energy-ray-curable ink jet recording ink composition produced in each of Examples or Comparative Examples was supplied to an evaluative ink jet printer including a shear-mode piezoelectric ink jet head, and printing was carried out such that a film having an intended thickness was formed on a polycarbonate plate (thickness: 1 mm, LEXAN manufactured by ASAHI GLASS CO., LTD.).

[Active-energy-ray (LED) Curability]

The active-energy-ray-curable ink jet recording ink composition produced in each of Examples or Comparative Examples was applied to a polycarbonate plate as in the above-mentioned printing such that a film having a thickness of 2 μm was formed. Then, the product was irradiated with light at an energy of 50 J/m$^2$ per irradiation with LED irradiation equipment having a stage-moving mechanism and manufactured by Hamamatsu Photonics K.K. (emission wavelength: 385 nm, peak intensity: 500 mW/cm$^2$). The integrated energy of light which had been radiated until a tack-free state was achieved was determined.

Meanwhile, in order to satisfy the conditions for practical printing with a printer in which an LED is used for curing, it is preferred that the ink have a sensitivity which enables curing at the integrated quantity of light of 200 mJ/cm$^2$.

[Abrasion Resistance: Abrasion Test with Non-Woven Fabric]

The active-energy-ray-curable ink jet recording ink compositions produced in Examples or Comparative Examples were applied to polycarbonate plates with a spin coater such that films having a thickness of approximately 6 μm were formed. Then, the products were irradiated with light with LED irradiation equipment having a stage-moving mechanism and manufactured by Hamamatsu Photonics K.K. (emission wavelength: 385 nm, peak intensity: 500 mW/cm$^2$) to the integrated quantity of light of 600 mJ/cm$^2$ to produce plates used for evaluating adhesiveness.

The cured toting film on each of the plates used for evaluating abrasion resistance was rubbed at a load of 1000 g with a non-woven fabric manufactured by Asahi Kasei Corp., and then damage on the surface was visually observed and then evaluated on the basis of the following three criteria. Good: no damage, Acceptable: slightly damaged, and Bad: Damaged

[Adhesiveness: Test by Peeling of Cross-cut Tape]

The active-energy-ray-curable ink jet recording ink compositions produced in Examples or Comparative Examples were applied to polycarbonate plates with a spin coater such that films having a thickness of approximately 6 μm were formed. Then, the products were irradiated with light with LED irradiation equipment having a stage-moving mechanism and manufactured by Hamamatsu Photonics K.K. (emission wavelength: 385 nm, peak intensity: 500 mW/cm$^2$) to the integrated quantity of light of 600 mJ/cm$^2$ to produce plates used for evaluating adhesiveness.

Cuts were made in the cured coating film on each of the plates used for evaluating adhesiveness with a knife to form 25 squares of a 5×5 grid, an adhesive cellophane tape manufactured by Nichiban Co., Ltd. was attached thereto, and then the product was scratched approximately 10 times with a nail. Then, the adhesive cellophane tape was swiftly removed at a removal rate of approximately 1 cm/sec, and the number of squares remaining on the coating film was observed. Result of the observation was evaluated on the basis of the following three criteria.

5: 25 to 21 squares, 4: 20 to 16 squares, 3: 15 to 11 squares, 2: 10 squares to 6 squares, 1: not more than 5 squares

[Storage Stability]

Into light-resistant glass containers, 15 ml of the active-energy-ray-curable ink jet recording ink compositions produced in Examples or Comparative Examples were put and statically stored in a thermostatic chamber at 60° C. for 4 weeks. The viscosity of each of the inks before the stationary storage was compared with the viscosity of corresponding one of the inks after the stationary storage, and the rate of change in the viscosity was obtained from the following formula. The viscosity was measured as in the above-mentioned measurement of viscosity as a physical property.

Rate of change in viscosity (%)=viscosity of ink after stationary storage/viscosity of ink before stationary storage×100(%)  [Math. 1]

In view of proper ink ejection from an ink jet head, a rate of change in the viscosity was evaluated on the basis of the following three criteria.

Good: less than 5%, Acceptable: 5 to 10%, and Bad: not less than 10%

TABLE 5

| Table 4 | Example 1 | Example 2 | Example 3 | Example 4 | Example 5 | Example 6 | Example 7 | Example 8 |
|---|---|---|---|---|---|---|---|---|
| Curability [mJ/cm$^2$] | 200 | 200 | 200 | 200 | 200 | 200 | 200 | 200 |
| Abrasion resistance | Good | Good | Good | Good | Good | Good | Good | Good |
| Adhesiveness | 5 | 5 | 5 | 5 | 5 | 5 | 5 | 5 |
| Storage stability | Good | Good | Good | Good | Good | Good | Good | Good |

TABLE 6

| Table 5 | Example 9 | Example 10 | Example 11 | Example 12 |
|---|---|---|---|---|
| Curability [mJ/cm$^2$] | 200 | 200 | 150 | 250 |
| Abrasion resistance | Good | Good | Good | Good |
| Adhesiveness | 5 | 5 | 5 | 5 |
| Storage stability | Good | Good | Acceptable | Good |

TABLE 7

| Table 6 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Curability [mJ/cm$^2$] | 200 | 300 | 200 | 400 | 1000 | 200 | 200 | 400 |
| Abrasion resistance | Acceptable | Acceptable | Bad | Bad | Bad | Acceptable | Bad | Bad |
| Adhesiveness | 4 | 3 | 5 | 2 | 1 | 5 | 5 | 2 |
| Storage stability | Good | Good | Acceptable | Acceptable | Acceptable | Bad | Good | Good |

TABLE 8

| Table 7 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|
| Curability [mJ/cm$^2$] | 300 | 300 | 300 | 300 | 200 | 200 | 200 |
| Abrasion resistance | Acceptable | Acceptable | Acceptable | Bad | Acceptable | Acceptable | Acceptable |
| Adhesiveness | 5 | 4 | 3 | 3 | 1 | 4 | 5 |
| Storage stability | Good | Good | Good | Good | Good | Good | Good |

(Effect of 2-(2-vinyloxyethoxy)ethyl(meth)acrylate Content)

The results of the evaluations in Examples 1 to 5 and Comparative Examples 1 and 2 shows that, in a cyan ink and an yellow ink, the 2-(2-vinyloxyethoxy)ethyl(meth)acrylate content of 15 to 35 mass % greatly enhanced the abrasion resistance of the coating films and adhesion to the plastic substrates. In Comparative Example 3,2-(2-vinyloxyethoxy) ethyl(meth)acrylate was not used, and diacrylate was used in the same total amount of the polyfunctional monomer; in Comparative Examples 4 and 5, divinyl ethers were similarly used. In Comparative Examples 3 to 5, abrasion resistance and storage stability were insufficient. In Comparative Examples in which divinyl ethers were used, adhesiveness was highly unsatisfactory. The results of the evaluations in Examples 9 and 12 showed that an increase in the 2-(2-vinyloxyethoxy)ethyl(meth)acrylate content was likely to lead to an enhancement in the curability of a black ink and that the 2-(2-vinyloxyethoxy)ethyl(meth)acrylate content of 15 mass % resulted in insufficient curability.

(Effect of N-vinylcaprolactam Content)

The results of the evaluations in Examples 3, 6, and 7 and Comparative Examples 6, 8, 9 to 14 show that, in a cyan ink and an yellow ink, the N-vinylcaprolactam content of 10 to 20 mass % greatly enhanced the abrasion resistance of the coating films and adhesion to the plastic substrates. In Comparative Example 6 in which the N-vinylcaprolactam content was greater than 25 mass %, storage stability was insufficient, and ink-ejecting properties were insufficient. The results of the evaluations in Examples 9 to 11 show that the storage stability of a black ink was no problem at the N-vinylcaprolactam content of 15 mass % but was unsatisfactory at the N-vinylcaprolactam content of 20 mass %. Furthermore, the results of the evaluations in Examples 9 to 11 and Comparative Example 15 show that an increase in the N-vinylcaprolactam content was likely to lead to an enhancement in the abrasion resistance of the coating films and that the N-vinylcaprolactam content of 5 mass % made the abrasion resistance of the coating film insufficient.

(Effect of Monofunctional Monomer Content)

The results of the evaluations in Examples 5 and 6 and Comparative Examples 6 and 7 show that the abrasion resistance was insufficient in the case where the mass % of the monofunctional monomer was greater than 25 mass % relative to the total amount of the active-energy-ray-polymerizable compounds. These results show that the mass % of the monofunctional monomer needed to be within 25 mass % relative to the total amount of the active-energy-ray-polymerizable compounds.

The invention claimed is:

1. An active-energy-ray-curable ink jet recording ink composition comprising active-energy-ray-polymerizable compounds and a photopolymerization initiator, wherein the active-energy-ray-polymerizable compounds comprise:
    10 to 25% by mass of a polymerizable compound having one active-energy-ray-polymerizable group relative to the total mass of the active-energy-ray-polymerizable compounds; and
    75 to 90% by mass of a polymerizable compound having at least two active-energy-ray-polymerizable groups relative to the total mass of the active-energy-ray-polymerizable compounds;

wherein the polymerizable compound having one active-energy-ray-polymerizable group includes 10 to 20% by mass of N-vinylcaprolactam relative to the total mass of the active-energy-ray-polymerizable compounds; and the polymerizable compound having at least two active-energy-ray-polymerizable groups includes 15 to 35% by mass of 2-(2-vinyloxyethoxyl)ethyl(meth)acrylate relative to the total mass of the active-energy-ray-polymerizable compounds.

2. The active-energy-ray-curable ink jet recording ink composition according to claim 1, further comprising a pigment that serves as a colorant.

3. A method for forming an image, the method comprising ejecting an active-energy-ray-curable ink jet recording ink composition to a recording medium to print an image and irradiating the image with an active energy ray having the peak wavelength ranging from 365 to 420 nm with a light-emitting diode to cure the image, wherein the active-energy-ray-curable ink jet recording ink composition is the ink composition according to claim 1.

4. The method according to claim 3, wherein the recording medium is a plastic material.

5. A method for forming an image, the method comprising ejecting an active-energy-ray-curable ink jet recording ink composition to a recording medium to print an image and irradiating the image with an active energy ray having the peak wavelength ranging from 365 to 420 nm with a light-emitting diode to cure the image, wherein the active-energy-ray-curable ink jet recording ink composition is the ink composition according to claim 2.

\* \* \* \* \*